United States Patent
Kurachi et al.

(10) Patent No.: US 9,688,573 B2
(45) Date of Patent: Jun. 27, 2017

(54) GLASS COMPOSITION, CHEMICALLY STRENGTHENED GLASS, AND GLASS SUBSTRATE FOR INFORMATION RECORDING MEDIUM

(71) Applicant: Nippon Sheet Glass Company, Limited, Tokyo (JP)

(72) Inventors: Junji Kurachi, Hyogo (JP); Yutaka Senshu, Hyogo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 44 days.

(21) Appl. No.: 14/898,334

(22) PCT Filed: Jun. 3, 2014

(86) PCT No.: PCT/JP2014/002957
§ 371 (c)(1),
(2) Date: Dec. 14, 2015

(87) PCT Pub. No.: WO2014/203481
PCT Pub. Date: Dec. 24, 2014

(65) Prior Publication Data
US 2016/0130177 A1 May 12, 2016

(30) Foreign Application Priority Data
Jun. 20, 2013 (JP) .................. 2013-129250

(51) Int. Cl.
*C03C 3/085* (2006.01)
*C03C 21/00* (2006.01)
*C03C 3/087* (2006.01)
*G11B 5/73* (2006.01)

(52) U.S. Cl.
CPC ............ *C03C 21/002* (2013.01); *C03C 3/085* (2013.01); *C03C 3/087* (2013.01); *G11B 5/7315* (2013.01)

(58) Field of Classification Search
CPC ......... C03C 3/085; C03C 3/087; C03C 21/00; C03C 21/002; G11B 5/73; G11B 5/7315
See application file for complete search history.

(56) References Cited

U.S. PATENT DOCUMENTS

| | | | |
|---|---|---|---|
| 6,251,812 | B1 | 6/2001 | Koyama et al. |
| 6,399,527 | B1 | 6/2002 | Kishimoto et al. |
| 6,949,485 | B2 | 9/2005 | Nakashima et al. |
| 7,803,472 | B2 | 9/2010 | Nagai et al. |
| 8,394,516 | B2 | 3/2013 | Matsumoto et al. |
| 9,156,723 | B2 | 10/2015 | Miyabe et al. |
| 2014/0011035 | A1 | 1/2014 | Senshu et al. |

FOREIGN PATENT DOCUMENTS

| | | |
|---|---|---|
| JP | 11-302032 | 11/1999 |
| JP | 2000-159544 | 6/2000 |
| JP | 2000-351649 | 12/2000 |
| JP | 2001-058843 | 3/2001 |
| JP | 2001-348246 | 12/2001 |
| JP | 2011-037683 | 2/2011 |
| WO | 2008/117758 | 10/2008 |
| WO | 2012/057338 | 5/2012 |
| WO | 2012/131824 | 10/2012 |

OTHER PUBLICATIONS

International Search Report issued in International Application No. PCT/JP2014/002957, Sep. 2, 2014, 4 pages.

*Primary Examiner* — Elizabeth A Bolden
(74) *Attorney, Agent, or Firm* — Hamre, Schumann, Mueller & Larson, P.C.

(57) ABSTRACT

The present invention provides a glass composition containing, in mass %: 59.0 to 63.0% $SiO_2$; 4.0 to 10.0% $TiO_2$; 8.0 to 12.0% $Al_2O_3$; 1.0 to 5.0% MgO; 0 to 4.0% CaO; 4.0 to 14.0% SrO; 4.0 to 11.0% $Na_2O$; and 0 to 1.0% $K_2O$. According to the present invention, it is possible to provide a glass composition having excellent heat resistance, being suitable for production by the float process, and being suitable for chemical strengthening.

11 Claims, No Drawings

GLASS COMPOSITION, CHEMICALLY STRENGTHENED GLASS, AND GLASS SUBSTRATE FOR INFORMATION RECORDING MEDIUM

TECHNICAL FIELD

The present invention relates to a glass composition suitable for chemical strengthening, and more specifically to a glass composition having properties suitable for use as a glass substrate for a magnetic recording medium such as a magnetic disk. The present invention also relates to a chemically strengthened glass obtained by chemically strengthening this glass composition. The present invention further relates to a glass substrate for an information recording medium in which this glass composition or this chemically strengthened glass is used.

BACKGROUND ART

Glass is a material capable of exhibiting excellent properties such as high surface smoothness and high surface hardness. Therefore, glass is suitable for use as substrates for magnetic recording media on which information is recorded using magnetic recording devices such as hard disk drives (HDD). When a glass substrate is used as a substrate for a magnetic recording medium, it is desirable to subject the glass substrate to chemical strengthening to increase its strength.

Chemical strengthening is a technique of replacing alkali metal ions contained in the glass surface by monovalent cations having a larger ionic radius so as to form a compressive stress layer in the glass surface. Chemical strengthening is performed, for example, by replacing lithium ions ($Li^+$) by sodium ions ($Na^+$) or by replacing sodium ions by potassium ions ($K^+$).

When a Pt—Fe magnetic material, which is more suitable for high-density recording than a conventional Co—Pt—Cr magnetic material, is used as a magnetic material to be deposited on a glass substrate to form a film thereon, the deposition needs to be performed at a higher temperature. Therefore, glass substrates for use as substrates for magnetic recording media are required to have superior heat resistance. Since the deposition temperature of this type of (Pt—Fe) magnetic material is 640° C. or above in the current state of the art, the glass substrates must be resistant to deformation in this temperature range.

For efficient mass production of glass substrates, it is desirable that their glass composition have properties suitable for mass production facilities for the float process or the like. Specifically, it is desirable that in the glass composition, the working temperature (a temperature at which the glass has a viscosity of $10^4$ dPa·s, hereinafter referred to as "$T_4$"), the liquidus temperature $T_L$, and the difference ($T_4$-$T_L$) obtained by subtracting the liquidus temperature from the working temperature $T_4$ satisfy the conditions suitable for production by the float process. The melting temperature is a temperature at which the glass has viscosity of $10^2$ dPa·s, and is hereinafter referred to as "$T_2$".

Patent Literature 1 discloses a glass composition being suitable for production using mass production facilities for the float process or the like, having high heat resistance, and being suitable for chemical strengthening. The glass composition having the above-mentioned properties is obtained, in particular, by adjusting the contents of divalent metal oxides MgO, CaO, SrO and BaO, which are collectively referred to as "RO", in terms of the effects of each of these oxides on the properties of the glass composition.

Patent Literature 2 discloses a substrate glass for data storage media having a glass transition temperature $T_g$ of 680° C. or more and having excellent weather resistance without being subjected to chemical strengthening treatment. Specifically, the glass transition temperature of the substrate glass for data storage media is increased by adjusting the content of $TiO_2$ and the content of $ZrO_2$.

Patent Literature 3, Patent Literature 4, and Patent Literature 5 each disclose a substrate glass used as an information recording medium substrate or a display substrate having excellent weather resistance without being subjected to chemical strengthening treatment.

CITATION LIST

Patent Literature

Patent Literature 1: WO 2012/131824 A1
Patent Literature 2: WO 2008/117758 A1
Patent Literature 3: JP 2001-348246 A
Patent Literature 4: JP 2001-58843 A
Patent Literature 5: JP 2000-351649 A

SUMMARY OF INVENTION

Technical Problem

The glass transition temperatures $T_g$ of the glass compositions of Examples of Patent Literature 1 are about 600° C. at the highest, and these glass compositions have room for further improvement of their heat resistance. The liquidus temperatures $T_L$ of the glasses of Examples of Patent Literature 2 are higher than 1140° C., and these liquidus temperatures are hardly suitable for the float process. The glasses of Examples of Patent Literatures 3 to 5 each have a high content of $K_2O$, which means that the compositions of these glasses are not suitable for chemical strengthening.

In view of the above circumstances, it is an object of the present invention to provide a glass composition having excellent heat resistance, being suitable for production by the float process, and being suitable for chemical strengthening. It is another object of the present invention to provide a chemically strengthened glass obtained by chemically strengthening such a glass composition.

Solution to Problem

In order to achieve the above object, the present invention provides a glass composition containing, in mass %; 59.0 to 63.0% $SiO_2$; 4.0 to 10.0% $TiO_2$; 8.0 to 12.0% $Al_2O_3$; 1.0 to 5.0% MgO; 0 to 4.0% CaO; 4.0 to 14.0% SrO; 4.0 to 11.0% $Na_2O$; and 0 to 1.0% $K_2O$.

The present invention also provides a chemically strengthened glass obtained by bringing this glass composition into contact with a molten salt containing monovalent cations having an ionic radius larger than that of sodium ions so as to allow ion exchange to take place between sodium ions contained in the glass composition and the monovalent cations.

Advantageous Effects of Invention

The glass composition according to the present invention can have a glass transition temperature $T_g$ of 640° C. or more, and therefore has excellent heat resistance. In the glass composition of the present invention, the working temperature $T_4$, the liquidus temperature $T_L$, and the difference $T_4$-$T_L$ obtained by subtracting the liquidus temperature $T_L$ from the working temperature $T_4$ satisfy the conditions suitable for the float process. Therefore, the float process can be used as a mass production method for glass substrates. Furthermore, in the glass composition of the present invention, the content of $Na_2O$ and the content of $K_2O$ are defined within a range suitable for chemical strengthening, and therefore the glass composition of the present invention is suitable for chemical strengthening.

DESCRIPTION OF EMBODIMENTS

Hereinafter, embodiments of the present invention are described below.

The following description relates to exemplary embodiments of the present invention, and the present invention is not limited to these embodiments.

Hereinafter, the percentages (%) of the components of glass compositions are all expressed in mass %, unless otherwise specified. In this description, the phrase "consisting essentially of components" means that the total content of the components referred to is 99.5 mass % or more, desirably 99.9 mass % or more, and more desirably 99.95 mass % or more. The phrase "being substantially free of a component" means that the content of the component is 0.1 mass % or less, and desirably 0.05 mass % or less.

The glass transition temperatures $T_g$ of the glass compositions of Examples of Patent Literature 1 are about 600° C. at the highest, and these glass compositions have room for further improvement of their heat resistance. So, the present invention is intended to improve the heat resistance by examining the content of $Na_2O$ and the content of $K_2O$ while ensuring the suitability for chemical strengthening of the resulting glass composition. The present invention is also intended to suppress an increase in the working temperature $T_4$ while improving the heat resistance by examining the content of $Al_2O_3$ and the content of $TiO_2$. In addition, the liquidus temperature is lowered by examining the contents of MgO, CaO and SrO, so that the difference $T_4$-$T_L$ between the working temperature $T_4$ and the liquidus temperature $T_L$ satisfies the conditions suitable for the float process.

Hereinafter, the components that should be contained in the glass composition of the present embodiment and the components that should be limited therein are described respectively.

($Na_2O$)

$Na_2O$ is a component that increases the surface compressive stress and the depth of the compressive stress layer through replacement of sodium ions by potassium ions. $Na_2O$ is also a component that increases the meltability and lowering the working temperature $T_4$ and the melting temperature $T_2$. On the other hand, an excessively high content of $Na_2O$ reduces the heat resistance (the glass transition temperature $T_g$) of the glass composition and thus relaxes the stress produced by replacement by potassium ions.

Therefore, $Na_2O$ is an essential component, and the appropriate content of $Na_2O$ is in the range of 4.0 to 11.0%. The content of $Na_2O$ is desirably 4.5% or more, and more desirably 5.0% or more. The content of $Na_2O$ is desirably 10.5% or less, and more desirably 10.0% or less. The content of $Na_2O$ is even more desirably in the range of 4.5 to 9%.

($K_2O$)

$K_2O$ is more likely to increase the working temperature $T_4$ and the melting temperature $T_2$ indicating the viscosity of the glass composition at high temperatures than $Na_2O$. $K_2O$ adversely affects the fining of the melt of the glass composition, which makes it difficult to remove bubbles from the glass melt. Therefore, the content of $K_2O$ is desirably as low as possible. However, it is acceptable that $K_2O$ is inevitably mixed as an impurity into the raw materials, etc. of the glass composition and contained in the glass composition. The glass composition of the present embodiment may be substantially free of $K_2O$.

Therefore, the appropriate content of $K_2O$ is in the range of 0 to 1.0%. The content of $K_2O$ is desirably 0 to 0.8%, and more desirably 0 to 0.5%.

($Li_2O$)

$Li_2O$ is highly effective in reducing the heat resistance (the glass transition temperature) of the glass composition. When the glass composition is subjected to chemical strengthening in a molten salt of potassium nitrate or a molten salt mixture of potassium nitrate and sodium nitrate, $Li_2O$ is eluted in the molten salt and inhibits the chemical strengthening. Therefore, the appropriate content of $Li_2O$ is 0.5% or less. The content of $Li_2O$ is desirably 0.2% or less and more desirably 0.1% or less. It is desirable that the glass composition of the present embodiment be substantially free of $Li_2O$.

($Al_2O_3$)

$Al_2O_3$ improves the chemical durability of the glass composition and further facilitates migration of alkali metal ions in the glass. $Al_2O_3$ is also a component that contributes to maintaining the strength obtained by chemical strengthening. On the other hand, an excessively high content of $Al_2O_3$ increases the liquidus temperature $T_L$, which makes it difficult to slowly cool molten glass in an appropriate manner to produce a glass sheet. This means that it is difficult to provide properties suitable for the float process to the glass composition.

Therefore, $Al_2O_3$ is an essential component, and the appropriate content of $Al_2O_3$ is in the range of 8.0 to 12.0%. The content of $Al_2O_3$ is desirably 11.5% or less, and more desirably 11.0% or less. The content of $Al_2O_3$ is desirably 8.5% or more, and more desirably 9.0% or more.

(MgO)

MgO is a component that increases the meltability of glass. MgO is most effective in promoting ion exchange, i.e., replacement of sodium ions in a glass composition by potassium ions or the like, in divalent alkaline earth metal oxides RO (MgO, CaO, SrO and BaO). On the other hand, an excessively high content of MgO inhibits migration of sodium ions in the glass. In addition, an excessively high content of MgO increases the liquidus temperature $T_L$ of the glass composition. Furthermore, an excessively high content of MgO sharply increases the devitrification growth rate. That is, when the content of MgO is too high, the devitrification onset temperature $T_{rd}$ to be described later increases monotonously and sharply as the content of MgO increases. In a glass melting furnace used in the float process, the temperature of the glass melt may be locally lowered in some portions under certain operational conditions. In such a case, in order to prevent the rapid onset of devitrification in the molten glass, it is desirable that the devitrification onset temperature $T_{rd}$ be lower and the difference ($T_L$-$T_{rd}$) obtained by subtracting the devitrification onset temperature $T_{rd}$ from the liquidus temperature $T_L$ be greater.

Therefore, MgO is an essential component, and the appropriate content of MgO is in the range of 1.0 to 5.0%. The content of MgO is desirably in the range of 1.0 to 4.5%, and more desirably in the range of 1.5 to 4.0%. The content of MgO is even more desirably in the range of 2.0 to 3.0%.

(SrO)

SrO reduces the high-temperature viscosity of glass, and therefore it contributes to lowering the melting temperature $T_2$ and the working temperature $T_4$. The liquidus temperature $T_L$ of a glass composition containing SrO is markedly lowered. In particular, when the glass composition contains a predetermined amount of MgO or a predetermined amount of CaO in addition to SrO, the liquidus temperature $T_L$ of the glass composition is specifically lowered. On the other hand, an excessively high content of SrO inhibits migration of sodium ions in the glass composition.

Therefore, SrO is an essential component, and the appropriate content of SrO is in the range of 4.0 to 14.0%. The content of SrO is desirably 5.0% or more, more desirably 6.0% or more, and it is desirably 7.0% or more in some cases. The content of SrO is desirably 13.5% or less, and more desirably 13.0% or less in some cases. The content of SrO is even more desirably in the range of 9.0 to 13.0%.

(CaO)

CaO has the effects of reducing the viscosity of a glass composition at high temperatures and lowering the liquidus temperature $T_L$ thereof if the content of CaO is within a predetermined range. However, an excessively high content of CaO inhibits migration of sodium ions in the glass composition. An excessively high content of CaO increases the liquidus temperature $T_L$ and lowers the glass transition temperature $T_g$.

Therefore, the glass composition may optionally contain CaO, and the appropriate content of CaO is in the range of 0 to 4.0%. The content of CaO is desirably 0.5% or more, and more desirably 1.0% or more. The content of CaO is desirably 3.0% or less. The content of CaO is even more desirably in the range of 2.0 to 3.0%.

(BaO)

BaO markedly inhibits migration of sodium ions in a glass composition. Even when added in a very slight amount, BaO significantly inhibits chemical strengthening of the glass composition. In addition, BaO and compounds such as barium carbonate and barium nitrate used as the raw materials of BaO are designated as toxic substances under the Poisonous and Deleterious Substances Control Law, and may cause environmental damage during their production and disposal. Therefore, BaO should be eliminated from the glass composition of the present embodiment, and it is desirable that the glass composition of the present embodiment be free of BaO.

(Details of RO)

When MgO/RO is in the range of 0.12 to 0.20, CaO/RO is in the range of 0.09 to 0.21, and SrO/RO is in the range of 0.61 to 0.77, in mass ratio, the liquidus temperature $T_L$ and the devitrification onset temperature $T_{rd}$ tend to be lower. In particular, the devitrification onset temperature $T_{rd}$ is likely to be lower.

($TiO_2$)

$TiO_2$ can increase the heat resistance of a glass composition. In addition, $TiO_2$ can suppress an increase in the high-temperature viscosity of the glass composition and can suppress an increase in the working temperature $T_4$ and the melting temperature $T_2$ of the glass composition. On the other hand, an excessively high content of $TiO_2$ is likely to cause devitrification because $TiO_2$ serves as a nucleation point.

Therefore, $TiO_2$ is an essential component, and the appropriate content of $TiO_2$ is in the range of 4.0 to 10.0%. The content of $TiO_2$ is desirably 5.0% or more, and more desirably 6.0% or more. The content of $TiO_2$ is desirably 9.0% or less, more desirably 8.5% or less, and it is desirably 8.0% or less in some cases.

($SiO_2$)

$SiO_2$ is the main component of a glass composition. An excessively low content of $SiO_2$ reduces the chemical durability and heat resistance of the glass. On the other hand, an excessively high content of $SiO_2$ increases the viscosity of the glass composition at high temperatures and thus makes it difficult to melt and form the glass composition. Therefore, the appropriate content of $SiO_2$ is in the range of 59.0 to 63.0%. The content of $SiO_2$ is desirably 59.0 to 62.0%, and more desirably 59.0 to 61.5%. The content of $SiO_2$ is even more desirably in the range of 59.0 to 61.0%.

($B_2O_3$)

$B_2O_3$ is a component that reduces the viscosity of a glass composition and improves the meltability of the glass composition. However, an excessively high content of $B_2O_3$ reduces the water resistance of the glass composition and thus makes the glass composition more susceptible to phase separation. In addition, a compound formed from $B_2O_3$ and an alkali metal oxide may be vaporized and damage the refractory material of the glass melting chamber. It is desirable that the glass composition of the present embodiment be substantially free of $B_2O_3$, but if it contains $B_2O_3$, the appropriate content of $B_2O_3$ is 0.5% or less.

($Fe_2O_3$)

Fe is normally present in the form of $Fe^{2+}O$ or $Fe^{3+}$ in glass. $Fe^{3+}$ is a component that improves the ultraviolet ray absorbing properties of glass, and $Fe^{2+}$ is a component that improves the heat ray absorbing properties of glass. However, Fe is not an essential component. The glass composition of the present embodiment may be substantially free of iron oxide. It is often the case that Fe derived from an industrial raw material is inevitably mixed in the glass composition, but the content of total iron oxide is, for example, 0.3% or less, and desirably 0.2% or less, as calculated in terms of $Fe_2O_3$. The content of $Fe_2O_3$ may be 0.1% or less in some cases. When the glass composition is used as a glass substrate for a magnetic recording medium such as a magnetic disk, the glass substrate is heated using an infrared lamp so as to deposit a magnetic material to form a film thereon. In order to increase the efficiency of this heating, it is desirable that the glass composition contain at least 0.01% of Fe in terms of $Fe_2O_3$.

($ZrO_2$)

Crystals containing $ZrO_2$ are hard to melt and are likely to remain unmelted in glass. Therefore, when a glass composition is used as a glass substrate for a magnetic recording medium such as a magnetic disk, unmelted $ZrO_2$ in the glass may collide with a magnetic head and damage the head. $ZrO_2$ derived from a refractory material used in the glass sheet mass production facilities or a raw material may be mixed into the glass composition. Therefore, it is acceptable that the glass composition of the present embodiment contain $ZrO_2$ as an impurity mixed therein. Therefore, the appropriate content of $ZrO_2$ is 0.1% or less, and the content of $ZrO_2$ is desirably 0.05% or less. The glass composition of the present embodiment may be substantially free of $ZrO_2$.

(Other Components)

It is desirable that the glass composition of the present embodiment consist essentially of the components sequentially described above as essential components. However, the glass composition of the present embodiment may contain components other than the components sequentially described above. In this case, the content of each of the other components is desirably less than 0.5% and more desirably less than 0.1%. Examples of the other components that the glass composition may contain include $As_2O_5$, $Sb_2O_5$, $SO_3$, $SnO_2$, $CeO_2$, Cl, and F, which may be added for the purpose of degassing the molten glass. However, it is not desirable to add $As_2O_5$, $Sb_2O_5$, Cl, and F for reasons such as serious adverse effects on the environment. $SO_3$ derived from a raw material added in the form of sulfate is suitable as a component to be added for degassing. Additional examples of the other components that the glass composition may contain include ZnO, $P_2O_5$, $GeO_2$, $Ga_2O_3$, $Y_2O_3$, and $La_2O_3$. The glass composition may contain a component other than those mentioned above which is derived from an industrially-used raw material, unless its content exceeds 0.1%. Since these other components are those which are optionally added if necessary or which are inevitably contained, the glass composition of the present embodiment may be substantially free of these components.

Hereinafter, the properties of the glass composition of the present embodiment are described.

(Glass Transition Temperature: $T_g$)

According to the present embodiment, it is possible to increase the glass transition temperature ($T_g$) of the glass composition to 640° C. or more, or even 650° C. or more in some cases so as to impart high heat resistance to the glass composition. Therefore, the glass composition of the present embodiment has properties suitable for use as a glass substrate for a magnetic recording medium such as a magnetic disk.

(Working Temperature: $T_4$)

In the float process, the viscosity of molten glass is adjusted to about $10^4$ dPa·s ($10^4$ P) when the molten glass is poured from the melting furnace into the float bath. In the production by the float process, the working temperature $T_4$ of the glass composition is desirably a predetermined temperature (for example, 1150° C.) or less, for example, to reduce the energy required for the production facilities. According to the present embodiment, it is possible to provide a glass composition having a lowered $T_4$ of 1150° C. or less, even 1140° C. or less, or, in some cases, 1130° C. or less and thus being suitable for production by the float process.

(Melting Temperature: $T_2$)

When the temperature (melting temperature: $T_2$) at which the molten glass has a viscosity of $10^2$ dPa·s is low, the amount of energy required to melt the glass raw materials can be reduced, and the glass raw materials can be more easily melted so that degassing and fining of the glass melt are promoted. According to the present embodiment, it is possible to reduce the $T_2$ to 1610° C. or less, further 1580° C. or less, or, in some cases, even 1560° C. or less.

(Difference between Working Temperature and Liquidus Temperature: $T_4$-$T_L$)

In the float process, it is necessary that molten glass does not devitrify when the temperature of the molten glass is the working temperature $T_4$. In other words, it is necessary that the working temperature $T_4$ is equal to or higher than the liquidus temperature $T_L$. The larger is the difference obtained by subtracting the liquidus temperature $T_L$ from the working temperature $T_4$, the less likely a glass product formed from the molten glass is to suffer from defects caused by devitrification and the more desirable it is. According to the present embodiment, it is possible to provide a glass composition for which a difference obtained by subtracting the liquidus temperature $T_L$ from the working temperature $T_4$ is as large as 0° C. or more, even 20° C. or more, or, in some cases, 40° C. or more. In addition, according to the present embodiment, it is possible to reduce the liquidus temperature $T_L$ of the glass composition to 1120° C. or less, and even 1100° C. or less, or, in some cases, 1080° C. or less. Consequently, the difference $T_4$-$T_L$ is easily increased.

(Density (Specific Gravity): d)

It is desirable that the glass composition d used as a glass substrate for a magnetic recording medium such as a magnetic disk, with which an electronic device is equipped, have a low density in order to reduce the weight of the electronic device. According to the present embodiment, it is possible to reduce the density of the glass composition to 2.75 g·cm$^{-3}$ or less, even 2.71 g·cm$^{-3}$ or less, or, in some cases, 2.67 g·cm$^{-3}$ or less.

The chemical strengthening of the glass composition is described below.

(Conditions of Chemical Strengthening)

Chemical strengthening of the glass composition described above can be achieved by ion exchange in which the glass composition containing sodium ions is brought into contact with a molten salt containing monovalent cations, desirably potassium ions, having an ionic radius larger than that of sodium ions so that the sodium ions in the glass composition are replaced by the monovalent cations. By doing so, a compressive stress layer with a compressive stress applied is formed in the surface of the glass sheet formed from the above-described glass composition. A typical example of the molten salt is potassium nitrate. A molten salt mixture of potassium nitrate and sodium nitrate also can be used, but it is desirable to use a molten salt of potassium nitrate alone because the concentration of the molten salt mixture is difficult to control. The temperature of the molten salt and the length of treatment time can be determined as appropriate depending on the composition, size, shape, etc. of the glass composition to be treated. In the case of using a molten salt of potassium nitrate alone, it is recommended to determine the temperature of the molten salt to be, for example, 460° C. to 500° C., in terms of the thermal decomposition of potassium nitrate and the heat resistance of the glass. The length of time during which the glass composition and the molten salt are brought into contact with each other is, for example, 4 hours to 12 hours.

(Compressive Stress Layer)

A chemically strengthened glass obtained by chemically strengthening the glass composition of the present embodiment has a compressive stress layer formed in its surface. This chemically strengthened glass has, for example, a strength defined in terms of a Vickers hardness of 580 or more under a load of 200 gf or a crack initiation load of 1.0 kgf or more. Thus, the chemically strengthened glass obtained by chemically strengthening the glass composition of the present embodiment has sufficient strength, and has a strength suitable for use as a glass substrate for a magnetic recording medium such as a magnetic disk.

According to the present embodiment, it is possible to provide a glass composition having high heat resistance and having properties suitable for production by the float process and suitable for chemical strengthening. A chemically strengthened glass obtained by chemically strengthening the glass composition of the present embodiment has high heat resistance, and therefore it is suitable for use as a glass substrate for a magnetic recording medium such as a magnetic disk. It should be noted that the glass composition of the present embodiment can also be used, for example, as a cover glass for a liquid crystal display, an organic EL display, or a touch panel display, or a substrate for an electronic device after being subjected to the chemical strengthening treatment or without being subjected to the treatment.

EXAMPLES

Hereinafter, the present invention will be described in more detail by way of Examples.

(Preparation of Glass Compositions)

Silica sand, titanium oxide, alumina, basic magnesium carbonate, calcium carbonate, strontium carbonate, and sodium carbonate, which are common raw materials of glass, were used to prepare glass formulations (batches) having the glass compositions shown in Table 1, Table 2, Table 3, Table 4, and Table 5. A small amount of sodium sulfate and carbon as fining agents were added to all the batches. The amount of sodium carbonate to be added was determined in terms of the amount of added sodium nitrate so as to prepare the glass formulations. In Example 24, Example 32, Comparative Example 1, Comparative Example 5, Comparative Example 6, Comparative Example 7, Comparative Example 10, Comparative Example 11, and Comparative Example 12, potassium carbonate was further added to the glass formulations. In Comparative Example 6, barium carbonate and zirconium oxide were further added to the glass formulation. In Comparative Example 7, lithium carbonate was further added. In Examples 1 to 6, almost impurity-free high purity silica sand was used as silica sand. The batches thus prepared were each put into a platinum crucible and heated in an electric furnace at 1580° C. for 4 hours to obtain molten glass. Next, the molten glass was poured on an iron plate for cooling to obtain a glass plate. Next, the glass plate was again placed in the electric furnace and held at an appropriate temperature ranging from 650° C. to 700° C. for 30 minutes, after which the furnace was powered off to slowly cool the glass plate to room temperature. Thus, a glass sample was obtained. In this manner, glass samples of Examples 1 to 52 and glass samples of Comparative Examples 1 to 12 were obtained. As shown in Tables 1 to 5, the glass samples of Examples and those of Comparative Examples each contained a predetermined amount of iron oxide in terms of $Fe_2O_3$ or a predetermined amount of $SO_3$, which were derived from the above-mentioned raw materials.

For each glass sample, the glass transition temperature $T_g$, the working temperature $T_4$, the melting temperature $T_2$, the liquidus temperature $T_L$, and the density d were measured.

The glass transition temperature $T_g$ was measured using a differential thermal analyzer (Thermoflex TMA8140, manufactured by Rigaku Corporation). The working temperature $T_4$ and the melting temperature $T_2$ were measured by a platinum ball pulling-up method. The density d was measured by an Archimedes method.

The liquidus temperature $T_L$ was measured in the following manner.

The glass sample was pulverized and sieved. Glass particles that passed through a 2380-µm mesh sieve but were retained on a 1000-µm mesh sieve were collected. These glass particles were immersed in ethanol, subjected to ultrasonic cleaning, and then dried in a thermostat. These glass particles weighing 25 g were spread to an approximately uniform thickness in a platinum boat having a width of 12 mm, a length of 200 mm, and a depth of 10 mm, and in this form were used as a measurement sample. This platinum boat was placed in an electric furnace (a temperature gradient furnace) with a temperature gradient from about 900° C. to 1140° C. and held therein for 2 hours. After that, the measurement sample was observed with an optical microscope at a magnification of 100, and the highest temperature in a region where devitrification was observed was determined to be the liquidus temperature $T_L$ of the sample. The measurement sample was visually observed, and the highest temperature at which the volume fraction of crystals reached 50% was determined to be the devitrification onset temperature $T_{rd}$.

(Preparation of Strengthened Glass)

Each of the glass samples was cut into a 25 mm×35 mm piece. Both surfaces of the piece were polished with alumina abrasive grains and further mirror-polished with cerium oxide abrasive grains. Thus, a 5 mm-thick glass block both surfaces of which had a surface roughness Ra (Ra determined according to JIS B 0601-1994) of 2 nm or less was obtained. This glass block was immersed in a molten salt of potassium nitrate heated at 480° C. for 8 hours so as to chemically strengthen the glass block. The glass substrate having been subjected to the chemical strengthening treatment was washed with 80° C. hot water. Thus, a strengthened glass block was obtained.

For the strengthened glass blocks obtained as described above, the Vickers hardness $H_V$ and the crack initiation load $R_C$ were evaluated. The Vickers hardness $H_V$ was evaluated using a Vickers hardness tester manufactured by Akashi Corporation, based on the square indentation formed by applying a load of 200 gf for 15 seconds by a Vickers indenter and then removing the load.

The crack initiation load $R_C$ was calculated in the following manner. First, a Vickers indenter was pressed against the surface of the strengthened glass block to apply a load of 1 kgf thereto for 15 seconds. 5 minutes after removal of the load, the number of cracks emanating from the corners of the square indentation formed on the surface of the strengthened glass block was counted. This counting was repeated 10 times, and the total number of cracks was divided by 40, which was the total number of the corners of the indentation for 10 times, so as to calculate the crack occurrence probability P. The level of the load applied was increased stepwise from 1 kgf as mentioned above to 2 kgf, 5 kgf, . . . until the crack occurrence probability P exceeded 50%, and the crack occurrence probability P was calculated at each of the applied loads in the same manner as described above. Thus, the two adjacent loads $W_H$ and $W_L$, between which the probability of 50% (P=50%) occurred, and the crack occurrence probabilities PH and PL at these two adjacent loads ($P_L$<50%<$P_H$) were obtained. The load at which a straight line connecting two points ($W_H$, $P_H$) and ($W_L$, $P_L$) passed through the point of P=50% was obtained and defined as the crack initiation load $R_C$. Tables 1 to 5 show the results.

In all Examples, the glass transition temperature $T_g$ was not less than 640° C., which demonstrated that the glass compositions of all Examples had excellent heat resistance. In all Examples, the working temperature $T_4$ was not more than 1150° C., the liquidus temperature $T_L$ was not more than 1116° C., and the difference $T_4$-$T_L$ obtained by subtracting the liquidus temperature $T_L$ from the working temperature $T_4$ was not less than 0° C., which demonstrated that the glass compositions of all Examples were suitable for production by the float process. Furthermore, the glass compositions of all Examples could be chemically strengthened. These results demonstrated that the glass compositions of all Examples had excellent heat resistance, were suitable for production by the float process, and were suitable for chemical strengthening.

By contrast, in the glass compositions of Comparative Examples 1, 2, and 4 to 11, the glass transition temperature $T_g$ was lower than 640° C., which demonstrated that the heat resistance of these glass compositions was hardly high enough. In the glass compositions of Comparative Examples 1, 3, and 12, the liquidus temperature $T_L$ was higher than 1120° C. In the glass composition of Comparative Example 1, the working temperature $T_4$ was higher than 1150° C. In the glass compositions of Comparative Examples 1, 3, and 5, the melting temperature $T_2$ was higher than 1610° C., which made it difficult to melt the materials and to degas and fine the glass melt. The glass composition of Comparative Example 6 containing as much as 0.4% $ZrO_2$ is not suitable for use as a glass substrate for a magnetic recording medium such as a magnetic disk because unmelted $ZrO_2$ could damage a magnetic head. Furthermore, the glass composition of Comparative Example 6 containing a toxic substance BaO requires careful handling during its production and disposal.

TABLE 1

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Composition [wt %] | $SiO_2$ | 59.6 | 59.1 | 59.0 | 59.5 | 59.4 | 59.1 | 60.2 | 60.0 | 59.6 | 60.2 | 60.2 | 60.9 |
| | $TiO_2$ | 7.3 | 7.2 | 7.2 | 7.3 | 7.3 | 7.3 | 8.1 | 6.9 | 6.9 | 6.9 | 7.4 | 6.8 |
| | $Al_2O_3$ | 10.9 | 10.8 | 10.8 | 10.9 | 10.9 | 10.9 | 10.4 | 10.3 | 10.3 | 10.4 | 9.4 | 9.5 |
| | MgO | 4.2 | 3.5 | 3.2 | 3.5 | 2.9 | 3.5 | 2.2 | 2.2 | 2.1 | 2.3 | 2.1 | 2.1 |
| | CaO | 0.6 | 0.6 | 1.0 | 1.5 | 2.3 | 1.5 | 2.2 | 2.2 | 1.4 | 2.4 | 1.3 | 3.0 |
| | SrO | 7.7 | 9.2 | 9.2 | 7.7 | 7.7 | 9.1 | 8.7 | 10.2 | 11.6 | 9.6 | 11.5 | 9.5 |
| | BaO | 0.0 | 0.0 | 0.0 | 0.0 | 0.0 | 0.0 | 0.0 | 0.0 | 0.0 | 0.0 | 0.0 | 0.0 |
| | $Li_2O$ | 0.0 | 0.0 | 0.0 | 0.0 | 0.0 | 0.0 | 0.0 | 0.0 | 0.0 | 0.0 | 0.0 | 0.0 |
| | $Na_2O$ | 9.7 | 9.6 | 9.6 | 9.6 | 9.6 | 8.7 | 8.3 | 8.2 | 8.2 | 8.3 | 8.1 | 8.2 |
| | $K_2O$ | 0.0 | 0.0 | 0.0 | 0.0 | 0.0 | 0.0 | 0.0 | 0.0 | 0.0 | 0.0 | 0.0 | 0.0 |
| | $ZrO_2$ | 0.0 | 0.0 | 0.0 | 0.0 | 0.0 | 0.0 | 0.0 | 0.0 | 0.0 | 0.0 | 0.0 | 0.0 |
| | $T-Fe_2O_3$ | 0.01 | 0.01 | 0.02 | 0.02 | 0.05 | 0.05 | 0.15 | 0.15 | 0.10 | 0.10 | 0.10 | 0.10 |
| | $SO_3$ | 0.12 | 0.14 | 0.12 | 0.10 | 0.13 | 0.11 | 0.11 | 0.12 | 0.11 | 0.10 | 0.11 | 0.10 |
| $T_g$ | ° C. | 644 | 640 | 641 | 640 | 640 | 642 | 658 | 649 | 651 | 651 | 648 | 647 |
| $T_L$ | ° C. | 1078 | 1053 | 1052 | 1050 | 1073 | 1078 | 1087 | 1068 | 1070 | 1078 | 1049 | 1095 |
| $T_2$ | ° C. | 1593 | 1565 | 1574 | 1580 | 1567 | 1584 | 1595 | 1596 | 1590 | 1592 | 1581 | 1577 |
| $T_4$ | ° C. | 1132 | 1113 | 1119 | 1126 | 1119 | 1125 | 1135 | 1128 | 1123 | 1128 | 1117 | 1118 |
| $T_4 - T_L$ | ° C. | 54 | 60 | 67 | 76 | 46 | 47 | 48 | 60 | 53 | 50 | 68 | 23 |
| $T_{rd}$ | ° C. | 1028 | 965 | 954 | 1007 | 928 | 1022 | 991 | <825 | <823 | 855 | 967 | <825 |
| $T_L - T_{rd}$ | ° C. | 50 | 88 | 98 | 43 | 145 | 56 | 96 | >243 | >247 | 223 | 82 | >270 |
| Hv | — | | 602 | | 598 | 600 | | | 608 | | | 610 | |
| Rc | kgf | | 2.3 | | 2.3 | 2.8 | | | 1.7 | | | 1.8 | |
| Density d | g/cm³ | 2.61 | 2.64 | 2.64 | 2.62 | 2.63 | 2.65 | 2.64 | 2.65 | 2.67 | 2.64 | 2.66 | 2.63 |

TABLE 2

| | | Examples | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Composition [wt %] | $SiO_2$ | 59.6 | 59.8 | 60.2 | 59.8 | 60.1 | 59.8 | 60.3 | 59.7 | 59.9 | 59.9 | 60.4 | 59.7 |
| | $TiO_2$ | 6.9 | 7.4 | 7.7 | 7.4 | 7.7 | 7.7 | 8.2 | 7.7 | 7.1 | 7.3 | 8.2 | 7.6 |
| | $Al_2O_3$ | 10.2 | 10.0 | 9.6 | 10.0 | 9.6 | 9.5 | 8.9 | 9.5 | 10.0 | 9.7 | 8.6 | 9.1 |
| | MgO | 2.1 | 2.1 | 2.1 | 2.2 | 2.1 | 2.5 | 2.5 | 2.7 | 2.2 | 2.2 | 2.2 | 2.2 |
| | CaO | 2.2 | 2.2 | 2.1 | 2.2 | 2.2 | 2.6 | 2.5 | 2.8 | 2.9 | 2.4 | 2.8 | 2.7 |
| | SrO | 11.7 | 10.1 | 9.9 | 10.3 | 10.1 | 12.2 | 11.9 | 12.9 | 11.6 | 12.2 | 12.2 | 12.7 |
| | BaO | 0.0 | 0.0 | 0.0 | 0.0 | 0.0 | 0.0 | 0.0 | 0.0 | 0.0 | 0.0 | 0.0 | 0.0 |
| | $Li_2O$ | 0.0 | 0.0 | 0.0 | 0.0 | 0.0 | 0.0 | 0.0 | 0.0 | 0.0 | 0.0 | 0.0 | 0.0 |
| | $Na_2O$ | 7.3 | 8.4 | 8.4 | 8.1 | 8.1 | 5.7 | 5.7 | 4.7 | 6.3 | 6.3 | 5.6 | 5.1 |
| | $K_2O$ | 0.0 | 0.0 | 0.0 | 0.0 | 0.0 | 0.0 | 0.0 | 0.0 | 0.0 | 0.0 | 0.0 | 0.8 |
| | $ZrO_2$ | 0.0 | 0.0 | 0.0 | 0.0 | 0.0 | 0.0 | 0.0 | 0.0 | 0.0 | 0.0 | 0.0 | 0.0 |
| | $T-Fe_2O_3$ | 0.10 | 0.10 | 0.10 | 0.10 | 0.10 | 0.10 | 0.10 | 0.10 | 0.10 | 0.10 | 0.10 | 0.10 |
| | $SO_3$ | 0.09 | 0.10 | 0.10 | 0.10 | 0.10 | 0.07 | 0.07 | 0.06 | 0.08 | 0.08 | 0.07 | 0.07 |
| $T_g$ | ° C. | 672 | 649 | 646 | 650 | 650 | 679 | 682 | 689 | 672 | 673 | 676 | 681 |
| $T_L$ | ° C. | 1080 | 1076 | 1076 | 1080 | 1083 | 1098 | 1108 | 1110 | 1113 | 1092 | 1116 | 1110 |
| $T_2$ | ° C. | 1594 | 1576 | 1572 | 1589 | 1575 | 1595 | 1592 | 1604 | 1598 | 1597 | 1583 | 1587 |
| $T_4$ | ° C. | 1125 | 1118 | 1117 | 1128 | 1118 | 1124 | 1123 | 1127 | 1127 | 1125 | 1116 | 1121 |
| $T_4 - T_L$ | ° C. | 45 | 42 | 41 | 48 | 35 | 26 | 15 | 17 | 14 | 33 | 0 | 11 |
| $T_{rd}$ | ° C. | 890 | 880 | 888 | 892 | 893 | 981 | 989 | 1002 | <823 | <825 | 924 | 920 |
| $T_L - T_{rd}$ | ° C. | 190 | 196 | 188 | 188 | 190 | 117 | 119 | 108 | >290 | >267 | 192 | 190 |
| Hv | — | | 615 | | | 615 | | 630 | | | | 633 | |
| Rc | kgf | 1.6 | | | 1.7 | | 1.3 | | | | 1.5 | | |
| Density d | g/cm³ | 2.66 | 2.64 | 2.64 | 2.65 | 2.64 | 2.68 | 2.68 | 2.69 | 2.67 | 2.68 | 2.68 | 2.69 |

TABLE 3

| | | Examples | | | | | | |
|---|---|---|---|---|---|---|---|---|
| | | 25 | 26 | 27 | 28 | 29 | 30 | 31 |
| Composition [wt %] | $SiO_2$ | 59.6 | 60.0 | 59.7 | 60.2 | 60.3 | 60.1 | 59.1 |
| | $TiO_2$ | 7.4 | 7.7 | 7.5 | 7.8 | 7.5 | 7.4 | 7.4 |
| | $Al_2O_3$ | 9.1 | 8.7 | 9.0 | 8.6 | 10.1 | 10.1 | 10.8 |
| | MgO | 2.2 | 2.1 | 2.4 | 2.3 | 2.8 | 2.2 | 2.2 |
| | CaO | 2.4 | 2.5 | 2.6 | 2.7 | 2.2 | 2.2 | 2.2 |
| | SrO | 13.6 | 13.3 | 13.8 | 13.5 | 8.9 | 8.8 | 10.3 |
| | BaO | 0.0 | 0.0 | 0.0 | 0.0 | 0.0 | 0.0 | 0.0 |
| | $Li_2O$ | 0.0 | 0.0 | 0.0 | 0.0 | 0.0 | 0.0 | 0.0 |
| | $Na_2O$ | 5.6 | 5.7 | 5.0 | 5.0 | 8.2 | 9.1 | 8.1 |
| | $K_2O$ | 0.0 | 0.0 | 0.0 | 0.0 | 0.0 | 0.0 | 0.0 |
| | $ZrO_2$ | 0.0 | 0.0 | 0.0 | 0.0 | 0.0 | 0.0 | 0.0 |
| | $T-Fe_2O_3$ | 0.10 | 0.10 | 0.10 | 0.10 | 0.10 | 0.10 | 0.10 |
| | $SO_3$ | 0.07 | 0.07 | 0.07 | 0.07 | 0.10 | 0.11 | 0.10 |
| $T_g$ | °C. | 678 | 677 | 686 | 685 | 655 | 645 | 660 |
| $T_L$ | °C. | 1088 | 1096 | 1104 | 1107 | 1104 | 1087 | 1103 |
| $T_2$ | °C. | 1546 | 1579 | 1590 | 1586 | 1591 | 1573 | 1586 |
| $T_4$ | °C. | 1130 | 1110 | 1115 | 1113 | 1129 | 1120 | 1125 |
| $T_4 - T_L$ | °C. | 42 | 14 | 11 | 6 | 25 | 33 | 22 |
| $T_{rd}$ | °C. | <823 | <825 | <823 | <825 | 998 | 858 | 926 |
| $T_L - T_{rd}$ | °C. | >265 | >271 | >281 | >282 | 106 | 229 | 177 |
| Hv | — | | | | 593 | | | |
| Rc | kgf | | | | | | | |
| Density d | g/cm$^3$ | 2.73 | 2.72 | 2.72 | 2.72 | 2.63 | 2.64 | 2.66 |

| | | Examples | | | | | | |
|---|---|---|---|---|---|---|---|---|
| | | 32 | 33 | 34 | 35 | 36 | 37 | 38 |
| Composition [wt %] | $SiO_2$ | 59.6 | 60.2 | 60.0 | 60.1 | 60.1 | 60.0 | 59.9 |
| | $TiO_2$ | 7.4 | 7.4 | 6.2 | 6.2 | 6.2 | 6.8 | 6.8 |
| | $Al_2O_3$ | 10.0 | 10.1 | 10.1 | 10.1 | 10.1 | 10.0 | 10.0 |
| | MgO | 2.2 | 2.2 | 2.2 | 2.8 | 2.5 | 2.5 | 2.2 |
| | CaO | 2.2 | 3.1 | 3.1 | 2.2 | 2.7 | 2.2 | 2.6 |
| | SrO | 10.3 | 8.8 | 10.4 | 10.4 | 10.4 | 10.4 | 10.4 |
| | BaO | 0.0 | 0.0 | 0.0 | 0.0 | 0.0 | 0.0 | 0.0 |
| | $Li_2O$ | 0.0 | 0.0 | 0.0 | 0.0 | 0.0 | 0.0 | 0.0 |
| | $Na_2O$ | 7.6 | 8.1 | 8.1 | 8.1 | 8.1 | 8.1 | 8.1 |
| | $K_2O$ | 0.7 | 0.0 | 0.0 | 0.0 | 0.0 | 0.0 | 0.0 |
| | $ZrO_2$ | 0.0 | 0.0 | 0.0 | 0.0 | 0.0 | 0.0 | 0.0 |
| | $T-Fe_2O_3$ | 0.10 | 0.10 | 0.10 | 0.10 | 0.10 | 0.10 | 0.10 |
| | $SO_3$ | 0.10 | 0.10 | 0.10 | 0.10 | 0.10 | 0.10 | 0.10 |
| $T_g$ | °C. | 653 | 657 | 654 | 651 | 650 | 654 | 652 |
| $T_L$ | °C. | 1086 | 1115 | 1097 | 1097 | 1070 | 1070 | 1081 |
| $T_2$ | °C. | 1595 | 1578 | 1571 | 1584 | 1578 | 1581 | 1575 |
| $T_4$ | °C. | 1125 | 1122 | 1113 | 1119 | 1116 | 1119 | 1116 |
| $T_4 - T_L$ | °C. | 39 | 7 | 16 | 22 | 46 | 49 | 35 |
| $T_{rd}$ | °C. | 882 | 873 | <825 | <823 | <825 | <823 | <825 |
| $T_L - T_{rd}$ | °C. | 204 | 242 | >272 | >274 | >245 | >247 | >256 |
| Hv | — | | 603 | | | | | |
| Rc | kgf | | 1.5 | | | | | |
| Density d | g/cm$^3$ | 2.66 | 2.64 | 2.66 | 2.65 | 2.65 | 2.66 | 2.66 |

TABLE 4

| | | Examples | | | | | | |
|---|---|---|---|---|---|---|---|---|
| | | 39 | 40 | 41 | 42 | 43 | 44 | 45 |
| Composition [wt %] | $SiO_2$ | 60.2 | 60.5 | 60.4 | 60.6 | 61.0 | 60.8 | 60.7 |
| | $TiO_2$ | 7.4 | 6.3 | 6.2 | 6.9 | 6.3 | 5.1 | 6.3 |
| | $Al_2O_3$ | 10.1 | 10.1 | 10.1 | 9.4 | 10.2 | 10.2 | 10.2 |
| | MgO | 2.5 | 2.8 | 2.2 | 2.8 | 3.2 | 3.2 | 3.5 |
| | CaO | 2.2 | 2.7 | 3.5 | 2.7 | 2.7 | 3.1 | 1.8 |
| | SrO | 8.8 | 8.9 | 8.9 | 8.9 | 7.4 | 8.9 | 8.9 |
| | BaO | 0.0 | 0.0 | 0.0 | 0.0 | 0.0 | 0.0 | 0.0 |
| | $Li_2O$ | 0.0 | 0.0 | 0.0 | 0.0 | 0.0 | 0.0 | 0.0 |
| | $Na_2O$ | 8.6 | 8.7 | 8.6 | 8.7 | 9.2 | 8.7 | 8.7 |
| | $K_2O$ | 0.0 | 0.0 | 0.0 | 0.0 | 0.0 | 0.0 | 0.0 |
| | $ZrO_2$ | 0.0 | 0.0 | 0.0 | 0.0 | 0.0 | 0.0 | 0.0 |
| | $T-Fe_2O_3$ | 0.10 | 0.10 | 0.10 | 0.10 | 0.10 | 0.10 | 0.10 |
| | $SO_3$ | 0.10 | 0.10 | 0.10 | 0.10 | 0.11 | 0.10 | 0.10 |
| $T_g$ | °C. | 650 | 647 | 645 | 642 | 641 | 642 | 648 |
| $T_L$ | °C. | 1088 | 1091 | 1099 | 1082 | 1079 | 1067 | 1038 |

TABLE 4-continued

| | | | | | | | | |
|---|---|---|---|---|---|---|---|---|
| $T_2$ | °C. | 1582 | 1581 | 1569 | 1562 | 1585 | 1581 | 1594 |
| $T_4$ | °C. | 1124 | 1121 | 1114 | 1109 | 1126 | 1117 | 1127 |
| $T_4 - T_L$ | °C. | 36 | 30 | 15 | 27 | 47 | 50 | 89 |
| $T_{rd}$ | °C. | <823 | <825 | <823 | <825 | <823 | <825 | 911 |
| $T_L - T_{rd}$ | °C. | >265 | >266 | >276 | >257 | >256 | >242 | 127 |
| Hv | — | | 591 | 605 | | 608 | 605 | |
| Rc | kgf | | 1.9 | 2.0 | | 2.9 | 1.7 | |
| Density d | g/cm³ | 2.63 | 2.64 | 2.64 | 2.64 | 2.62 | 2.63 | 2.63 |

| | | Examples | | | | | | |
|---|---|---|---|---|---|---|---|---|
| | | 46 | 47 | 48 | 49 | 50 | 51 | 52 |
| Composition [wt %] | $SiO_2$ | 60.9 | 61.3 | 61.0 | 60.5 | 60.4 | 60.4 | 60.3 |
| | $TiO_2$ | 6.9 | 6.3 | 6.6 | 6.9 | 6.9 | 6.8 | 6.8 |
| | $Al_2O_3$ | 9.4 | 10.3 | 9.8 | 10.1 | 10.1 | 10.1 | 10.1 |
| | MgO | 4.1 | 4.4 | 3.6 | 3.1 | 2.8 | 2.5 | 2.2 |
| | CaO | 0.9 | 1.0 | 1.8 | 1.8 | 2.2 | 2.7 | 3.1 |
| | SrO | 8.9 | 7.4 | 8.2 | 8.9 | 8.9 | 8.9 | 8.8 |
| | BaO | 0.0 | 0.0 | 0.0 | 0.0 | 0.0 | 0.0 | 0.0 |
| | $Li_2O$ | 0.0 | 0.0 | 0.0 | 0.0 | 0.0 | 0.0 | 0.0 |
| | $Na_2O$ | 8.7 | 9.3 | 9.0 | 8.7 | 8.7 | 8.6 | 8.6 |
| | $K_2O$ | 0.0 | 0.0 | 0.0 | 0.0 | 0.0 | 0.0 | 0.0 |
| | $ZrO_2$ | 0.0 | 0.0 | 0.0 | 0.0 | 0.0 | 0.0 | 0.0 |
| | $T - Fe_2O_3$ | 0.10 | 0.10 | 0.10 | 0.10 | 0.10 | 0.10 | 0.10 |
| | $SO_3$ | 0.10 | 0.11 | 0.11 | 0.10 | 0.10 | 0.10 | 0.10 |
| $T_g$ | °C. | 645 | 645 | 644 | 645 | 646 | 649 | 647 |
| $T_L$ | °C. | 1033 | 1051 | 1045 | 1057 | 1071 | 1093 | 1100 |
| $T_2$ | °C. | 1589 | 1610 | 1587 | 1591 | 1585 | 1565 | 1572 |
| $T_4$ | °C. | 1123 | 1139 | 1124 | 1128 | 1124 | 1119 | 1118 |
| $T_4 - T_L$ | °C. | 90 | 88 | 79 | 71 | 53 | 26 | 18 |
| $T_{rd}$ | °C. | 955 | 1007 | 925 | 950 | 901 | 924 | <825 |
| $T_L - T_{rd}$ | °C. | 78 | 44 | 120 | 107 | 170 | 169 | >275 |
| Hv | — | | 608 | | | | 615 | |
| Rc | kgf | | 3.4 | | | | 1.9 | |
| Density d | g/cm³ | 2.63 | 2.61 | 2.62 | 2.63 | 2.63 | 2.63 | 2.64 |

TABLE 5

| | | Comparative Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Composition [wt %] | $SiO_2$ | 60.4 | 60.0 | 59.8 | 61.3 | 59.9 | 61.8 | 66.0 | 61.6 | 65.8 | 71.6 | 61.3 | 52.0 |
| | $TiO_2$ | 6.3 | 8.8 | 6.3 | 3.9 | 3.6 | 0.0 | 0.0 | 1.4 | 0.0 | 0.0 | 0.0 | 4.8 |
| | $Al_2O_3$ | 11.1 | 11.0 | 14.1 | 11.2 | 11.4 | 3.1 | 15.3 | 11.3 | 10.7 | 1.7 | 9.1 | 12.6 |
| | MgO | 5.5 | 3.6 | 4.2 | 5.6 | 2.2 | 6.9 | 1.1 | 5.6 | 2.9 | 4.0 | 7.5 | 2.8 |
| | CaO | 0.6 | 0.6 | 0.6 | 0.6 | 2.5 | 3.6 | 2.1 | 0.6 | 6.5 | 8.0 | 0.6 | 4.1 |
| | SrO | 4.6 | 4.5 | 4.5 | 4.6 | 9.6 | 11.9 | 0.0 | 4.7 | 0.0 | 0.0 | 1.6 | 12.4 |
| | BaO | 0.0 | 0.0 | 0.0 | 0.0 | 0.0 | 0.2 | 0.0 | 0.0 | 0.0 | 0.0 | 0.0 | 0.0 |
| | $Li_2O$ | 0.0 | 0.0 | 0.0 | 0.0 | 0.0 | 0.0 | 3.8 | 0.0 | 0.0 | 0.0 | 0.0 | 0.0 |
| | $Na_2O$ | 8.7 | 11.5 | 10.5 | 12.7 | 9.3 | 2.0 | 11.4 | 14.8 | 14.0 | 13.8 | 16.7 | 4.5 |
| | $K_2O$ | 2.9 | 0.0 | 0.0 | 0.0 | 1.4 | 10.2 | 0.3 | 0.0 | 0.0 | 0.9 | 3.2 | 6.8 |
| | $ZrO_2$ | 0.0 | 0.0 | 0.0 | 0.0 | 0.0 | 0.4 | 0.0 | 0.0 | 0.0 | 0.0 | 0.0 | 0.0 |
| | $T - Fe_2O_3$ | 0.01 | 0.01 | 0.10 | 0.10 | 0.10 | 0.10 | 0.10 | 0.10 | 0.10 | 0.10 | 0.10 | 0.10 |
| | $SO_3$ | 0.15 | 0.15 | 0.13 | 0.14 | 0.13 | 0.19 | 0.12 | 0.17 | 0.16 | 0.17 | 0.21 | 0.15 |
| $T_g$ | °C. | 638 | 625 | 657 | 621 | 634 | 631 | 493 | 599 | 593 | 558 | 549 | 656 |
| $T_L$ | °C. | >1140 | 1112 | >1140 | 992 | 1042 | 1120 | 957 | 936 | 1073 | 1011 | <900 | >1141 |
| $T_2$ | °C. | 1613 | 1578 | 1673 | 1586 | 1618 | 1510 | 1582 | 1552 | 1568 | 1440 | 1502 | 1477 |
| $T_4$ | °C. | 1158 | 1134 | 1191 | 1125 | 1138 | 1121 | 1045 | 1100 | 1098 | 1024 | 1059 | 1082 |
| $T_4 - T_L$ | °C. | <18 | 22 | <51 | 133 | 96 | 1 | 88 | 164 | 25 | 13 | >159 | <-59 |
| $T_{rd}$ | °C. | | 1074 | | | <825 | | | | | | | |
| $T_L - T_{rd}$ | °C. | | 38 | | | >217 | | | | | | | |
| Hv | — | | | | | | 545 | | | | | | |
| Rc | kgf | | | | | | <1.0 | | | | | | |
| Density d | g/cm³ | 2.55 | 2.56 | 2.55 | 2.55 | 2.62 | 2.67 | 2.45 | 2.54 | 2.49 | 2.50 | 2.51 | 2.73 |

INDUSTRIAL APPLICABILITY

The present invention can provide a glass composition having properties suitable for use as a glass substrate for a magnetic recording medium such as a magnetic disk and also having properties suitable for production by the float process and suitable for chemical strengthening.

The invention claimed is:

1. A glass composition comprising, in mass %:
59.0 to 63.0% $SiO_2$;
4.0 to 10.0% $TiO_2$;
8.0 to 12.0% $Al_2O_3$;
1.0 to 5.0% MgO;
0 to 4.0% CaO;
4.0 to 14.0% SrO;

4.0 to 11.0% $Na_2O$; and
0 to 1.0% $K_2O$.

2. The glass composition according to claim 1, wherein a content of $Na_2O$ is 4.5 to 10.5 mass %.

3. The glass composition according to claim 1, wherein a content of $Al_2O_3$ is 8.5 to 11.5 mass %.

4. The glass composition according to claim 1, wherein a content of $TiO_2$ is 5.0 to 9.0 mass %.

5. The glass composition according to claim 1, a glass transition temperature $T_g$ is 640° C. or more.

6. The glass composition according to claim 1, wherein a temperature $T_4$ at which the glass composition has a viscosity of $10^4$ dPa·s is 1150° C. or less.

7. The glass composition according to claim 1, wherein a liquidus temperature $T_L$ is 1120° C. or less.

8. The glass composition according to claim 1, wherein a difference obtained by subtracting a liquidus temperature $T_L$ from a temperature $T_4$ at which the glass composition has a viscosity of $10^4$ dPa·s is 0° C. or more.

9. A chemically strengthened glass obtained by bringing the glass composition according to claim 1 into contact with a molten salt containing monovalent cations having an ionic radius larger than that of sodium ions so as to allow ion exchange to take place between sodium ions contained in the glass composition and the monovalent cations.

10. A glass substrate for an information recording medium, comprising the glass composition according to claim 1.

11. A glass substrate for an information recording medium, comprising the chemically strengthened glass according to claim 9.

* * * * *

UNITED STATES PATENT AND TRADEMARK OFFICE
CERTIFICATE OF CORRECTION

| | | |
|---|---|---|
| PATENT NO. | : 9,688,573 B2 | Page 1 of 1 |
| APPLICATION NO. | : 14/898334 | |
| DATED | : June 27, 2017 | |
| INVENTOR(S) | : Kurachi et al. | |

It is certified that error appears in the above-identified patent and that said Letters Patent is hereby corrected as shown below:

In the Specification

Column 6, Line 28, delete "$Fe2+0$" and insert -- $Fe^{2+}$ --.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*